United States Patent
Smart et al.

(10) Patent No.: US 6,957,127 B1
(45) Date of Patent: Oct. 18, 2005

(54) DYNAMIC CURRENT-TO-PNEUMATIC CONVERTER AND PNEUMATIC AMPLIFIER

(75) Inventors: Harold R. Smart, Portsmouth, RI (US); Chuhe Zhou, Stoughton, MA (US)

(73) Assignee: Dresser, Inc., Addison, TX (US)

( * ) Notice: Subject to any disclaimer, the term of this patent is extended or adjusted under 35 U.S.C. 154(b) by 981 days.

(21) Appl. No.: 09/696,991

(22) Filed: Oct. 26, 2000

Related U.S. Application Data

(63) Continuation-in-part of application No. 09/118,406, filed on Jul. 17, 1998, now Pat. No. 6,272,401.
(60) Provisional application No. 60/053,648, filed on Jul. 23, 1997.

(51) Int. Cl.$^7$ .......................... G06F 19/00; F16K 31/00
(52) U.S. Cl. .................................. 700/289; 251/129.07
(58) Field of Search .................... 137/450, 628–630.22, 137/115.13–115.15, 14, 82–86; 138/26, 30, 31, 37, 39; 239/533.1–533.15, 569, 570; 251/129.07, 205–209, 281–283, 331, 336; 700/281, 282, 289, 301

(56) References Cited

U.S. PATENT DOCUMENTS

| | | | |
|---|---|---|---|
| 4,209,122 A | | 6/1980 | Hunt ....................... 228/173.5 |
| 4,263,997 A | | 4/1981 | Poore ...................... 192/103 R |
| 4,274,438 A | | 6/1981 | LaCoste ....................... 137/551 |
| 4,481,451 A | | 11/1984 | Kautz et al. ................. 318/628 |
| 4,509,403 A | | 4/1985 | Gassman et al. .............. 91/365 |
| 4,523,286 A | | 6/1985 | Koga et al. .................. 702/183 |
| 4,556,956 A | | 12/1985 | Dickenson et al. ........... 700/42 |
| 4,664,136 A | * | 5/1987 | Everett ......................... 137/85 |
| 4,712,173 A | | 12/1987 | Fujiwara et al. ................ 700/9 |
| 4,792,113 A | * | 12/1988 | Eidsmore ...................... 251/65 |
| 4,796,854 A | * | 1/1989 | Ewing .................... 251/129.07 |
| 5,070,846 A | | 12/1991 | Dudek et al. ................ 123/488 |
| 5,078,362 A | * | 1/1992 | Lawless et al. ................ 251/9 |
| 5,197,328 A | | 3/1993 | Fitzgerald ..................... 73/168 |
| 5,232,196 A | * | 8/1993 | Hutchings et al. ..... 251/129.08 |

(Continued)

FOREIGN PATENT DOCUMENTS

| | | |
|---|---|---|
| JP | 09-189370 | 7/1997 |
| JP | 10-064064 | 3/1998 |

OTHER PUBLICATIONS

The Authoritative Dictionary of IEEE Standards Terms 2000, Standards Information Network IEEE Press, 7$^{th}$ Edition, p. 422.

(Continued)

Primary Examiner—Maria N. Von Buhr
(74) Attorney, Agent, or Firm—Fish & Richardson P.C.

(57) ABSTRACT

A dynamically balanced pneumatic relay amplifier and a current-to-pneumatic converter are disclosed. The relay has a balance plug, a supply plug positioned on top of the balance plug, a bead chain connecting the balance plug and the supply plug, and a vent plug positioned on top of the supply plug. The relay also includes a baffle positioned on top of the vent plug. The converter, used in an electro-pneumatic positioner, comprises a flat strip made of magnetic material located in proximity to a nozzle, and a flow regulator having a flat spring securing a plug in a seat within the regulator. The converter also includes a cantilevered flexure integrally secured to a molded spring support, a first bias spring positioned on a first side of the flexure, and a second bias spring positioned on a second side of the flexure. The thickness of the flexure is locally reduced in an area not integrated into the molded spring support.

6 Claims, 4 Drawing Sheets

STEADY STATE

U.S. PATENT DOCUMENTS

| | | | |
|---|---|---|---|
| 5,249,954 A | | 10/1993 | Allen et al. .................... 431/14 |
| 5,251,148 A | | 10/1993 | Haines et al. ................ 700/282 |
| 5,272,647 A | | 12/1993 | Hayes .......................... 702/45 |
| 5,329,465 A | | 7/1994 | Arcella et al. ............... 702/184 |
| 5,381,816 A | * | 1/1995 | Alsobrooks et al. ...... 137/15.22 |
| 5,390,697 A | * | 2/1995 | Muschelknautz ........... 137/494 |
| 5,431,182 A | | 7/1995 | Brown ......................... 137/85 |
| 5,469,737 A | | 11/1995 | Smith et al. ................... 73/168 |
| 5,526,690 A | | 6/1996 | Louie et al. ................... 73/592 |
| 5,543,696 A | | 8/1996 | Huggett et al. ............. 318/590 |
| 5,549,137 A | | 8/1996 | Lenz et al. ................. 137/486 |
| 5,573,032 A | | 11/1996 | Lenz et al. ................. 137/486 |
| 5,654,885 A | | 8/1997 | Mayhew et al. ............ 700/282 |
| 5,684,451 A | | 11/1997 | Seberger et al. ........ 340/310.06 |
| 5,687,098 A | | 11/1997 | Grumstrup et al. ......... 700/282 |
| 5,697,554 A | * | 12/1997 | Auwaerter et al. ............ 239/88 |
| 5,878,765 A | | 3/1999 | Lange ........................... 137/1 |
| 5,884,894 A | | 3/1999 | Smith .......................... 251/28 |
| 5,966,679 A | | 10/1999 | Snowbarger et al. ....... 702/105 |
| 5,992,229 A | | 11/1999 | Pyotsia et al. ................. 73/168 |
| 6,016,875 A | | 1/2000 | Orbach et al. .................. 172/2 |
| 6,035,878 A | | 3/2000 | Adams et al. .................. 137/1 |
| 6,192,321 B1 | | 2/2001 | Grumstrup et al. ......... 702/113 |
| 6,262,401 B1 | * | 7/2001 | Knoeppel et al. ........... 219/543 |
| 6,272,401 B1 | | 8/2001 | Boger et al. ................ 700/282 |
| 6,367,766 B1 | * | 4/2002 | Briant et al. ........... 251/129.02 |
| 6,453,261 B2 | * | 9/2002 | Boger et al. ................ 702/138 |
| 6,466,893 B1 | | 10/2002 | Latwesen et al. ........... 702/179 |
| 6,745,084 B2 | * | 6/2004 | Boger et al. .................. 700/13 |

OTHER PUBLICATIONS

European Patent Office, Supplementary Partial European Search Report, Application No. EP 98 93 4660, Dec. 10, 2001.

Patent Cooperation Treaty, International Search Report, International Application No. PCT/US98/14978, Jun. 29, 1999.

Patent Cooperation Treaty, International Preliminary Examination Report, International Application No. PCT/US98/14978, Jan. 13, 2000.

Fisher Bulletin 62.1:VL1000; DVC5000, DVC5000(S1); DT4000; Jun. 1994, pp. 1–26.

Fisher Bulletin 62.1:DT4000(S1); Sep. 1994, pp. 1–8.

Fisher Bulletin 62.1:DT4000; Dec. 1995, pp. 1–12.

Foxboro/Eckardt SRD991 Product Information, Oct. 1995, pp. 1–2.

Hartmann & Braun, Intelligent Positioner TZID—Product Information, pp. 1–2, no date.

Honeywell, Series EP2300 Electro–pneumatic positioner—Product Information, pp. 1–4, no date.

Moore, ValvePAC Intelligent Valve Control—Product Information, pp. 1–5, no date.

Neles–Jamesbury, The ND800 Valve Controller—Product Information, pp. 1–4, no date.

Samson, Product Information, pp. 1–23, no date.

Siemens, SIPART PS—Product Information, pp. 1–6, no date.

Valtek, Logix/StarPac/StarPacII—Product Information, pp. 1–17, no date.

Hart, IcoT—Product Information, pp. 1–17, no date.

Worcester Controls, Pulsair—Product Information, pp. 1–25, no date.

Yokogawa, ValveManager—Product Information, pp. 1–25, no date.

* cited by examiner

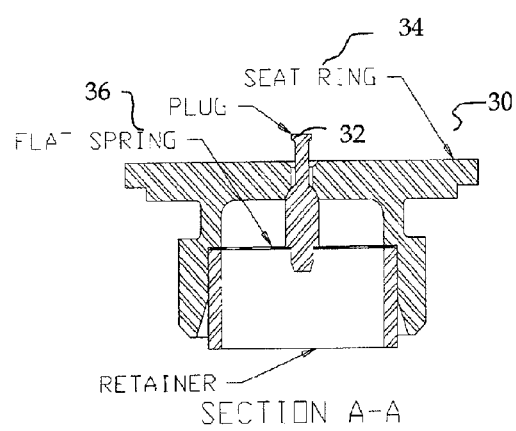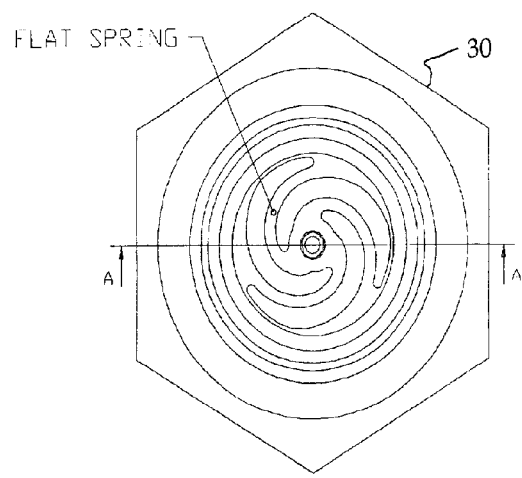
Fig. 3B                    Fig. 3A

DYNAMIC CURRENT-TO-PNEUMATIC CONVERTER AND PNEUMATIC AMPLIFIER

CROSS REFERENCE

This application is a Continuation-in-Part application of Ser. No. 09/118,406, filed Jul. 17, 1998, now U.S. Pat. No. 6,272,401 which issued on Aug. 7, 2001 and claims benefit of provisional application 60/053,648 Jul. 23, 1997

BACKGROUND OF THE INVENTION

The present invention relates generally to valve position systems, and more particularly, to a flexure used in a current-to-pneumatic (I/P) converter, a low cost I/P converter, and a dynamically balanced pneumatic amplifier.

One major purpose of an I/P converter is to produce a pneumatic pressure proportional to a given electrical current. This produced pressure may be referred to as a signal pressure. This signal pressure is traditionally amplified, both in pressure and volume, and fed to a pneumatic actuator used to position a valve in a valve positioner system as described in the U.S. patent application Ser. No. 09/118,406, which is assigned to the same assignee and incorporated herein by reference.

In addition, in a typical 2-stage valve positioner, the second stage is used to amplify both the flow capacity and pressure range of the output since a typical I/P converter has a low flow and minimal pressure gain. Masoneilan and other pneumatic control valve positioner manufacturers have traditionally used two types of pneumatic amplifiers. One type is a spool valve design. The second type is of a pneumatic relay, which is commonly called a relay. The spool valve provides a very consistent dynamic response, but is difficult to manufacture to ensure that it performs well in a steady state. The traditional relay type is easy to manufacture and has a good steady state performance, but lacks in its ability to perform with a consistent dynamic response. Inherent to the design of the relay is an end loading of a supply plug on a corresponding supply seat during steady state operation of the relay. This end loading is due to the pressure drop across the plug and the force due to a supply plug spring. During a dynamic response of the relay, a signal pressure must be increased sufficiently to overcome this end loading before any additional output flow is established. This change in signal pressure with no corresponding output flow is referred to as a flow deadband.

For the improvement of the valve positioner system, what is needed is a low cost I/P converter for use in an electro-pneumatic positioner which operates with supply pressures between 20 psi and 100 psi.

What is also needed is a flexure used in the I/P converter for use in the electro-pneumatic positioner. The characteristics of this flexure must provide temperature and vibration resistance for the I/P converter. Also this flexure should be capable of providing sufficient gain required for operating the electro-pneumatic positioner.

What is further needed is an improved design of the relay type amplifier, which provides consistent dynamic response with minimal effect on the manufacturability or its steady state performance.

SUMMARY OF THE INVENTION

A dynamically balanced pneumatic relay is disclosed. In one example, the relay has a balance plug, a supply plug positioned on top of the balance plug, a bead chain connecting the balance plug and the supply plug, and a vent plug positioned on top of the supply plug. The relay integrated with the balance plug, the supply plug, and the vent plug avoids a flow deadband during which a signal pressure generated by the amplifier changes with no corresponding output flow. This is accomplished because the dead band is caused by forces deriving from an end loading, and the end load is function of a supply pressure and the addition of the balance plug adds a force (which is also a function of the supply pressure) thereby opposing forces from the end loading. The relay thus provides both a reliable steady state amplifier performance and a consistent dynamic response.

In another example, the relay further comprises a baffle positioned on top of the vent plug for counteracting a back pressure created during a venting process.

A current-to-pneumatic converter used in an electro-pneumatic positioner is also disclosed. In one example, the converter has a flexure-nozzle arrangement to produce a signal pressure proportional to a given electrical current. The converter comprises a flat strip made of magnetic material located in proximity to a nozzle, and a flow regulator having a flat spring securing a plug in a seat within the regulator, wherein the regulator maintains a near constant fluid feeding the nozzle.

In another example, a design of a current-to-pneumatic converter of an electro-pneumatic positioner is disclosed. The converter comprises a cantilevered flexure integrally secured to a molded spring support, a first bias spring positioned on a first side of the flexure, and a second bias spring positioned on a second side of the flexure. The flexure, the molded spring support, and the bias springs are centered around a nozzle of the converter. The thickness of the flexure is locally reduced in an area not integrated into the molded spring support. The converter thus designed has a predetermined temperature and vibration resistance of the flexure.

BRIEF DESCRIPTION OF THE DRAWINGS

FIG. 3A illustrates a top view of a flow regulator.

FIG. 3B illustrates a sectional view of a flow regulator of FIG. 3A.

DESCRIPTION OF THE PREFERRED EMBODIMENT

This application incorporates by reference in its entirety U.S. Pat. No. 6,272,401 of which this application is a Continuation-in-Part.

Figure 1:
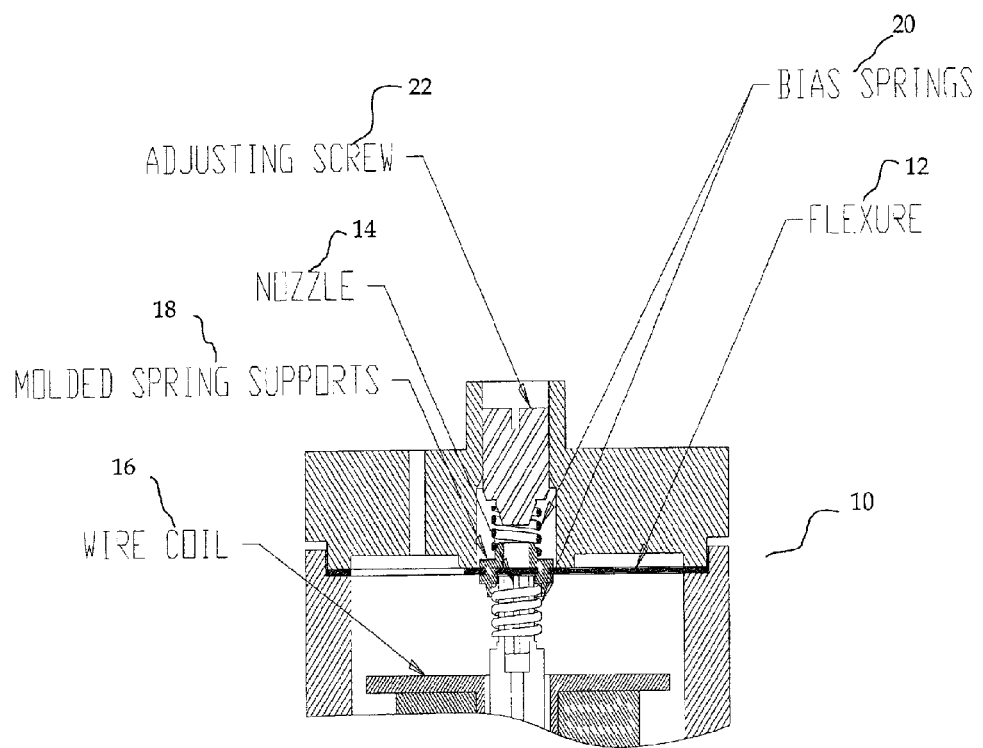
FIG. 1 illustrates a portion of a current-to-pneumatic converter.

Referring to FIG. 1, a portion of an I/P converter 10 is shown. As described above, the purpose of the I/P converter is to generate a signal pressure proportional to a given electrical current. One improved design of a low cost I/P converter according to one example of the present invention uses a flexure-nozzle arrangement to produce the signal pressure. A flexure 12 is a flat strip located in close proximity to a nozzle 14. The flexure 12 is acted on by a variable magnetic force produced by a current flowing through a wire coil 16, thereby creating a back pressure in the nozzle. The flexure is further integrated with a molded spring support 18 and two bias springs 20. There is an adjusting screw 22 sitting on top of the I/P converter.

Figure 2:
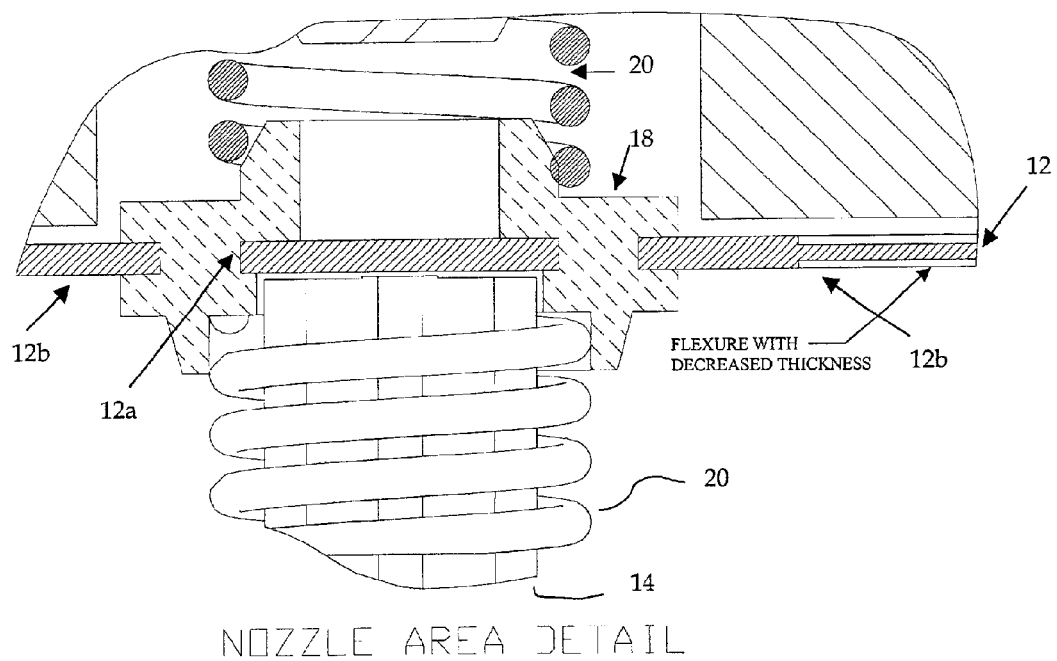
FIG. 2 illustrates a detailed view of a flexure assembly within the converter of FIG. 1.

Referring now to FIG. 2, a detailed view of a flexure assembly is shown. As it is clearly shown, the flexure has a portion 12a embedded within the molded spring support, and a cantilevered portion 12b. The cantilevered flexure 12 allows for the flexure to expand and contract perpendicular to the nozzle 14, thereby maintaining a constant distance between the flexure and nozzle under all temperatures. In addition, the molded spring support 18 maintains a correct alignment of the bias springs 20, which are used to set the zero condition of the I/P converter and further enhance the strength of the flexure assembly. The bias spring 20 also increases the stiffness of the entire flexure assembly. It is known that the stiffer the flexure assembly the higher the natural frequency, and the higher the natural frequency the greater the vibration resistance created in the I/P converter.

The flexure is made of a soft magnetic material to produce both the flexibility and the magnetic effect. As a general rule, a given amount of magnetic material will only produce a limited amount of electromagnetic force. Therefore a particular thickness of the flexure is required to produce adequate magnetic force. This may cause an increase in the thickness of the flexure, and further create excessive stiffness. To solve this problem, the thickness of the flexure is reduced locally on the cantilever portion 12b of the flexure. Consequently, this design creates a flexure with adequate magnetic material but with optimal stiffness.

This flexure assembly design utilizes a one-piece cantilever flexure made from soft magnetic material with a locally decreased thickness, and provides for a constant air gap at all temperatures.

Referring now to FIGS. 3A and 3B, a top view and a sectional view of a flow regulator are shown. Also, with regard to the I/P converter 10 as shown in FIG. 1, it is further understood that a flow of a predetermined liquid feeding the nozzle must be maintained at a near constant rate under all supply pressures. A flow regulator 30 is conventionally used to perform this task. The flow regulator 30 has a small plug 32 and a seat ring 34. The plug 32 is preferred to seat correctly in the seat ring 34 all the time during the operation of the I/P converter. A spring is usually used to ensure the plug 32 is seated appropriately in the seat ring 34. Traditional compression and tapered springs have been used to perform this task. In one example of the present invention, a "flat spring" 36 is used to perform this task. The flat spring 36 not only provides a spring force as a conventional spring, it also centers the plug 32 in the seat ring 34.

The flat spring requires significantly less space than a traditional compression spring. It is also easier to assemble than the compression spring and improves the centering of the plug.

Figures 4A, 4B:
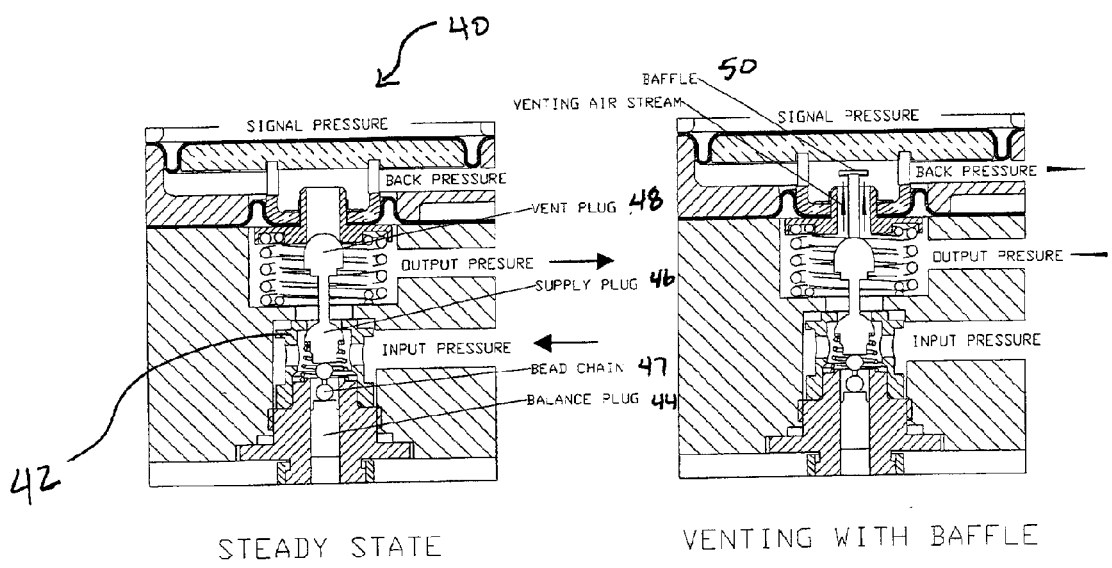
FIG. 4A illustrates a sectional view of a relay used in the valve positioner system according to one example of the present invention.
FIG. 4B illustrates a sectional view of a relay used in the valve positioner system according another example of the present invention.

Referring now to FIG. 4A, a sectional view of a relay amplifier 40 (a "relay") used in the valve positioner system is shown. As it is known, there are generally two types of amplifiers used in the valve positioner system, the spool valve type and the relay type. The relay amplifier does not perform as well dynamically as the spool valve type amplifier because it has an inherent flow dead band. This flow dead band causes a condition where the signal pressure to the relay can be changed with no corresponding relay output flow change.

To minimize the flow dead band, a plug assembly 42 of the relay is designed to be "balanced" with the input and output pressures. This balancing objective is achieved by adding a balance plug 44 and sizing the areas the air pressure acts thereon. This balance plug 44 is secured to a supply plug 46 using a bead chain 47. This bead chain 47 provides for a secure attachment while providing minimal opportunity for side loading the balance plug 44. It is known that side loading adds additional undesirable dead band due to frictions created. Since the dead band is caused by forces deriving from the end loading, and the end load is function of a supply pressure, the addition of the balance plug adds a force which is also a function of the supply pressure to oppose forces from the end loading.

With the balance plug 44 installed, a steady state condition is achieved in the relay, but does not work well during venting conditions for high output pressures. While venting from high output pressures a back pressure is established which acts on a vent plug 48 and opens the supply plug 46.

Referring now to FIG. 4B, the relay is shown according to another example of the present invention. To help counteract with the undesired back pressure force, a baffle 50 is added to the vent plug 46 in the pathway of the venting air stream The forces on this baffle due to the air stream are sufficient to counteract the back pressure forces. The addition of the baffle allows the balanced relay to be used with higher supply pressures.

The above disclosure provides many different embodiments, or examples, for implementing different features of the invention. Specific examples of components, and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. An amplifier of a dynamically balanced pneumatic relay type, the amplifier comprising:
   a balance plug adapted to generate a balancing force proportional to an input signal pressure, the balancing force operable to oppose an end load force acting on the amplifier;
   a supply plug positioned proximate to and on top of the balance plug;
   a bead chain adapted to couple the balance plug to the supply plug; and
   a vent plug coupled to the top of the supply plug, wherein the balance plug, the supply plug, and the vent plug are integrated and adapted to avoid a flow deadband in which a signal pressure generated by the amplifier changes without corresponding output flow, and wherein the integrated balance plug, supply plug, and vent plug provide a steady state output flow proportional to the input signal pressure.

2. The amplifier of claim 1 further comprising a baffle positioned on top of the vent plug for counteracting a back pressure created during a venting process.

3. A current-to-pneumatic converter used in an electro pneumatic positioner, the converter having a flexure-nozzle arrangement to produce a signal pressure proportional to a given electrical current, the converter comprising:
   a coil adapted to supply a variable electromagnetic effect within the converter proportional to current supplied to the coil;

a flat strip made of magnetic material located in proximity to a nozzle, a portion of the flat strip integrated into a molded spring support, the flat strip having a thickness, wherein the thickness of the flat strip is locally reduced in an area not integrated into the molded spring support; and a flow regulator having a flat spring securing a plug in a seat within the regulator, the flow regulator proximate to the flat strip of magnetic material, wherein the regulator maintains a near constant fluid flow feeding the nozzle, and wherein the electro-magnetic effect from the coil is operable to act on the flat strip of magnetic material to move the plug to allow a pneumatic pressure proportional to the supply current.

4. A current-to-pneumatic converter of an electropneumatic positioner, the converter comprising:

a cantilevered flexure integrally secured to a molded spring support;

a first bias spring positioned on a first side of the flexure; and a second bias spring positioned on a second side of the flexure, wherein the flexure, the molded spring support, and the bias springs are centered around a nozzle of the converter, wherein a thickness of the flexure is locally reduced in an area not integrated into the molded spring support.

5. A method for generating an output flow proportional to a signal pressure, the method comprising:

receiving an input signal pressure into a rely-type amplifier, the amplifier comprising:

a balance plug adapted to generate a balancing force proportional to the input signal pressure;

a supply plug coupled to the balance plug by a bead chain, the supply plug adapted to allow a portion of the input signal pressure to enter the amplifier; and a vent plug proximate to the supply plug, the vent plug adapted to vent high output pressures;

generating an output pressure proportional to the input signal pressure.

6. The method of claim 5, further comprising the step of coupling a baffle to the vent plug, the baffle adapted to counteract back pressure generated by the output flow.

* * * * *